United States Patent
Leeson et al.

(10) Patent No.: US 12,386,130 B2
(45) Date of Patent: Aug. 12, 2025

(54) SPOOL ENCLOSURE FOR A TERMINAL

(71) Applicant: PPC BROADBAND FIBER LTD., Woodbridge (GB)

(72) Inventors: Kim Leeson, Ipswich (GB); Shaun Trezise, Aldeburgh (GB); Harvey Etheridge, Norfolk (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 148 days.

(21) Appl. No.: 17/857,521

(22) Filed: Jul. 5, 2022

(65) Prior Publication Data
US 2023/0002186 A1   Jan. 5, 2023

Related U.S. Application Data (60) Provisional application No. 63/217,925, filed on Jul. 2, 2021.

(51) Int. Cl.
*G02B 6/44* (2006.01)
*B65H 75/44* (2006.01)

(52) U.S. Cl.
CPC ........ *G02B 6/4441* (2013.01); *B65H 75/4428* (2013.01); *B65H 75/4471* (2013.01); *B65H 2701/32* (2013.01)

(58) Field of Classification Search
CPC ............ B65H 75/4428; B65H 75/4471; B65H 2701/32; G02B 6/4441
See application file for complete search history.

(56) References Cited

U.S. PATENT DOCUMENTS

| | | | |
|---|---|---|---|
| 5,971,316 A * | 10/1999 | Kim | B65H 75/18 242/603 |
| 9,904,026 B2 * | 2/2018 | Burek | G02B 6/4441 |
| 10,139,582 B2 * | 11/2018 | Burek | G02B 6/4441 |
| 2007/0274659 A1 | 11/2007 | Kaplan | |
| 2012/0138725 A1 * | 6/2012 | Chen | B65H 75/4428 242/378.1 |
| 2013/0183017 A1 * | 7/2013 | de los Santos Campos | B65H 75/4471 242/601 |
| 2017/0371120 A1 | 12/2017 | Morris et al. | |
| 2019/0079257 A1 | 3/2019 | Daoust et al. | |

FOREIGN PATENT DOCUMENTS

| | | |
|---|---|---|
| EP | 0626603 A1 | 11/1994 |
| EP | 3229054 A2 | 10/2017 |

OTHER PUBLICATIONS

International Search Report and Written Opinion dated Oct. 6, 2022 in corresponding International Application No. PCT/US2022/036061, 10 pages.

* cited by examiner

*Primary Examiner* — Anna M Momper
*Assistant Examiner* — Nathaniel L Adams
(74) *Attorney, Agent, or Firm* — MH2 TECHNOLOGY LAW GROUP LLP (57) ABSTRACT

A cable spool module for a terminal module includes a skirt, a cable spool and a retention member. The cable spool may include a lower flange, an upper flange and a barrel disposed between the lower and upper flanges. The retention member may be configured to couple a terminal module to the cable spool. The skirt may be configured to be removed from the lower flange to permit access to the cable spool and the slack fiber optic cable wound on the cable spool.

39 Claims, 9 Drawing Sheets

SPOOL ENCLOSURE FOR A TERMINAL

CROSS-REFERENCE TO RELATED APPLICATION

This application claims priority to U.S. Provisional Patent Application No. 63/217,925, filed Jul. 2, 2021, the disclosure of which is incorporated herein by reference in its entirety.

TECHNICAL FIELD

The present disclosure relates generally to a spool enclosure for storing and dispensing cable such as, for example, fiber optic cable.

BACKGROUND

As demand for telecommunications increases, fiber optic networks are being extended in more and more areas. Conventionally, fiber optic enclosures are used to provide a subscriber access point to the fiber optic network. The fiber-optic access network may include an optical line terminal (OLT) at a central office (CO) and a number of optical network terminals (ONTs), located at or near subscribers' premises (e.g., home, office building, etc.). Such fiber optic enclosure (ONT's) are connected to the fiber optic network through a subscriber cable connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

Figure 1:
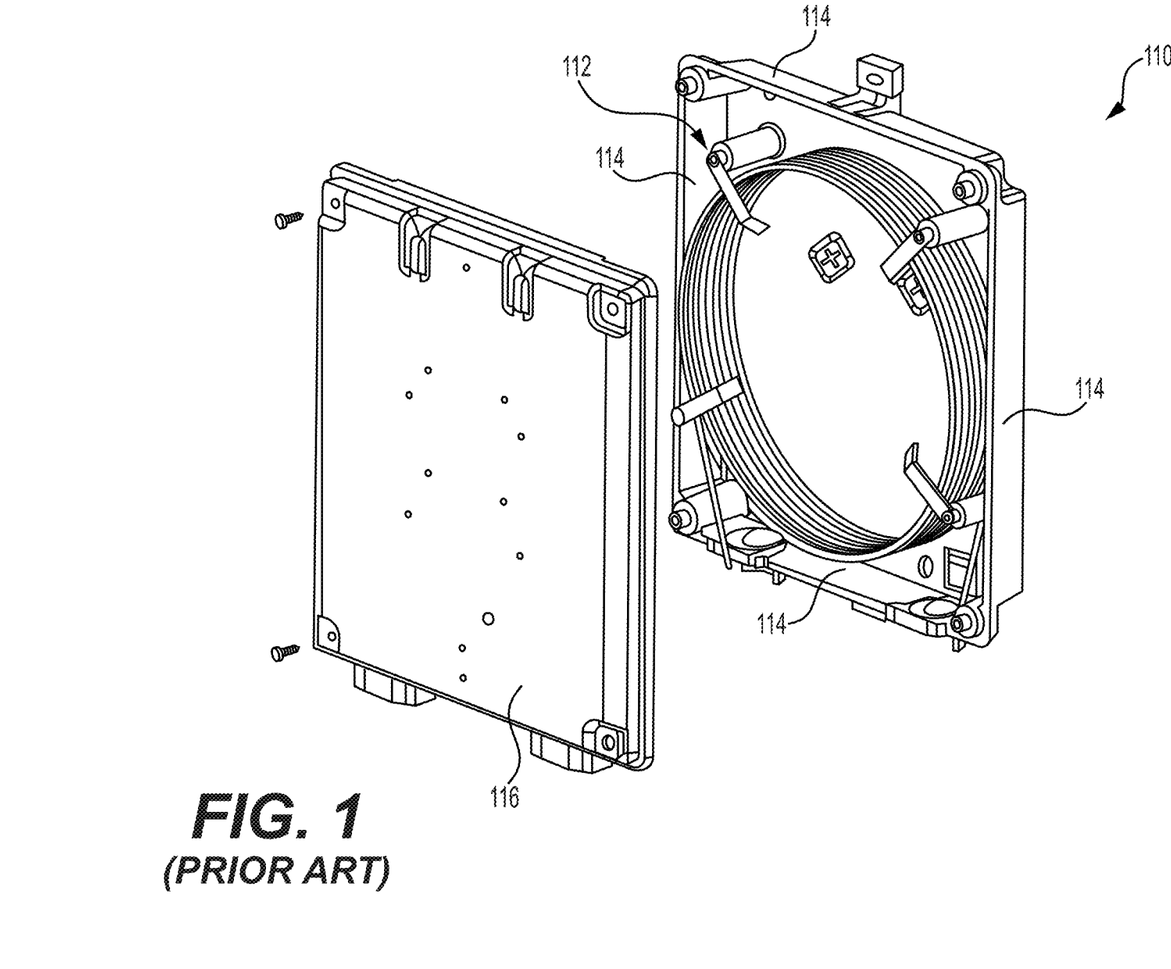
FIG. 1 is an expanded assembly view of a traditional cable spool enclosure.

Conventional fiber optic enclosures include a spool of fiber optic cable provided on a plate that is mounted separately from the optical network terminal (ONT) and/or provided in the interior of a boxed enclosure that is also mounted in a region that is adjacent to and separate from the optical network terminal. When installing fiber optics from enclosure to enclosure, paying out cable from a spool can present a variety of issues. If a spool 112 is recessed within the interior of an enclosure 110 having a cover 116 (such as that shown in FIG. 1), access to the spool 112 becomes limited and cumbersome due to the walls 114. Moreover, the enclosure 110 is generally mounted in a region that is adjacent to and separate from the ONT. On the other hand, if the spool is provided on a plate, the spool of excess cable is exposed to the environment and may be subject to tampering as well.

Therefore, it may be desirable to provide a slack storage assembly configured to selectively provide access to slack fiber optic cable of an optical network terminal stored within a periphery of the optical network terminal. For example, it may be desirable to provide a skirt configured to block access to slack fiber optic cable wound on a cable spool when the skirt is coupled with the optical network terminal and to be removed from the optical network terminal to permit access to the slack fiber optic cable wound on the cable spool. In some aspects, it may be desirable to provide the skirt with a tab configured to prevent the slack storage cable from unwinding from the cable spool.

SUMMARY

In example one embodiment of the present disclosure, a cable spool module for a terminal includes a skirt, a cable spool, and a retention member. The skirt includes a first lateral side and a second lateral side. The cable spool includes a barrel, an upper flange, and a lower flange that is configured to be mounted to a surface. The retention member is configured to couple a terminal to the cable spool. The second lateral side of the skirt is configured to be removably affixed to at least a portion of an outer or peripheral region of the lower flange and the first lateral side of the skirt is configured to abut the terminal. The barrel and the upper flange are configured to be disposed between the lower flange and the terminal when the retention member couples the terminal to the cable spool and when the skirt is attached to the lower flange.

With respect to the various embodiments of the present disclosure, the skirt is configured to be movable between a storage state, where the skirt is removably attached to the lower flange and the optical network terminal, and a payout state, where the skirt is detached from the lower flange (and/or the mounting plate) and the optical network terminal. In the storage state, the skirt is configured to block access to the cable spool and slack fiber optic cable wound on the cable spool when the skirt is coupled with the lower flange and/or a mounting plate. In the payout state, the skirt is configured to permit access to the cable spool and the slack fiber optic cable wound on the cable spool to allow for payout of the slack fiber optic cable. The optical network terminal may be coupled to the skirt via retention member(s).

With respect to the various embodiments of the present disclosure, the cable spool is configured to distribute a cable to/from a lateral direction (when the skirt is not mounted onto one of the lower flange or the plate thereby allowing a user to have open access to the cable wound about the barrel of the cable spool and/or allowing a user to wind cable about the barrel of the cable spool in a fast and easy manner. However, the skirt, and the terminal are configured to enclose, protect and store the barrel, the cable spool and cable (that is wound about the barrel) when the skirt is mounted to an outer region of one of the lower flange or the plate and when the retention member couples the terminal to the cable spool.

In this embodiment, the upper flange of the cable spool may be integral to a distal end of the barrel and a proximate end of the barrel may be integral to the lower flange. The skirt may be a flexible, elongated member having a first end and a second end wherein the second end is configured to be joined to the first end when the skirt is mounted to the outer region of the lower flange. The skirt may further includes a plurality of interior tabs configured to abut an upper surface of the upper flange when the skirt is mounted to the lower flange. The retention member is configured to couple the terminal to the cable spool when a distal portion of the retention member is disposed within a terminal aperture. The terminal aperture is defined on a rear side of the terminal module.

In this first example embodiment, the retention member may include a base portion and the distal portion. The base portion may be affixed to the cable spool and extends substantially perpendicularly away from the cable spool. The distal portion of the retention member may be substantially perpendicular to the base portion.

In this embodiment, a secondary retention member may also be affixed to the cable spool wherein the secondary retention member is also configured to couple the terminal to the cable spool. Similar to the retention member, the secondary retention member may include a secondary base portion and a secondary distal portion. The secondary base portion may extend substantially perpendicularly away from the cable spool. The secondary distal portion is substantially perpendicular to the secondary base portion.

Also, in this embodiment, at least a portion of the second lateral side of the skirt may define a skirt overhang or protuberance that is configured to be interlocked with a flange overhang or protuberance that is defined in the outer or peripheral region of the lower flange.

In another example embodiment of the present disclosure, a cable spool module may include a skirt, a plate, a cable spool, and a retention member. The plate may be mounted to a surface such as a wall. The cable spool may be mounted onto the plate. A retention member may also be affixed to the cable spool or the plate. The skirt and the terminal are configured to enclose the cable spool when a distal portion of the retention member is disposed within a terminal aperture and when the skirt is affixed to at least one of the plate or the cable spool. The retention member of this embodiment may include a base portion which extends substantially perpendicularly away from the spool and a distal portion that is integral to the base portion and is substantially perpendicular to the base portion.

In this embodiment, the skirt may be a flexible, elongated member having a first lateral side and a second lateral side wherein the second lateral side is configured to engage with at least a portion of an outer region of the plate. The skirt may further include a first end and a second end configured to be joined to the first end when the skirt is mounted to the outer region of the lower flange. The skirt may further include a plurality of interior tabs configured to abut an upper surface of the upper flange when the skirt is mounted to one of the lower flange or the plate.

In this embodiment, at least a portion of the outer or peripheral region of the plate or lower flange may define an overhang which may configured to be interlocked with an overhang defined by the skirt. Alternatively, at least a portion of the second lateral side of the skirt defines an overhang that is configured to be received within a recess or opening defined in an outer region of the plate or lower flange.

In yet another example embodiment of the present disclosure, a network unit may be provided which includes a first module, a second module and a retention member. The first module may be in electronic communication with a network. The second module may include a cable spool and a skirt. The retention member may be configured to couple the first module to the cable spool. The skirt may be a flexible member that is removably affixed to an outer or peripheral region of the cable spool. The skirt and the first module are configured to enclose the cable spool when skirt is removably affixed to an outer region of the cable spool and when the retention member couples the first module to the cable spool.

In this embodiment, a distal end of the retention member is configured to engage with an aperture defined on a rear side of the first module. The retention member the skirt may, but not necessarily, be affixed to the cable spool. The skirt may be a flexible, elongated member having a first lateral side and a second lateral side wherein the second lateral side is configured to engage with at least a portion of an outer or peripheral region of a lower flange of the cable spool. The skirt may also have a first end and a second end configured to be joined to the first end when the skirt is mounted to the outer or peripheral region of the cable spool.

It is also understood that a secondary retention member may be affixed to the cable spool wherein the secondary retention member is also configured to couple the terminal to the cable spool. The terminal may also define a secondary terminal aperture that is configured to receive a distal portion of the secondary retention member.

BRIEF DESCRIPTION OF THE DRAWINGS

Further advantages and features of the present disclosure will become apparent from the following description and the accompanying drawings, to which reference is made. In which are shown.

DETAILED DESCRIPTION

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the"

comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this present disclosure pertains.

Figure 2:
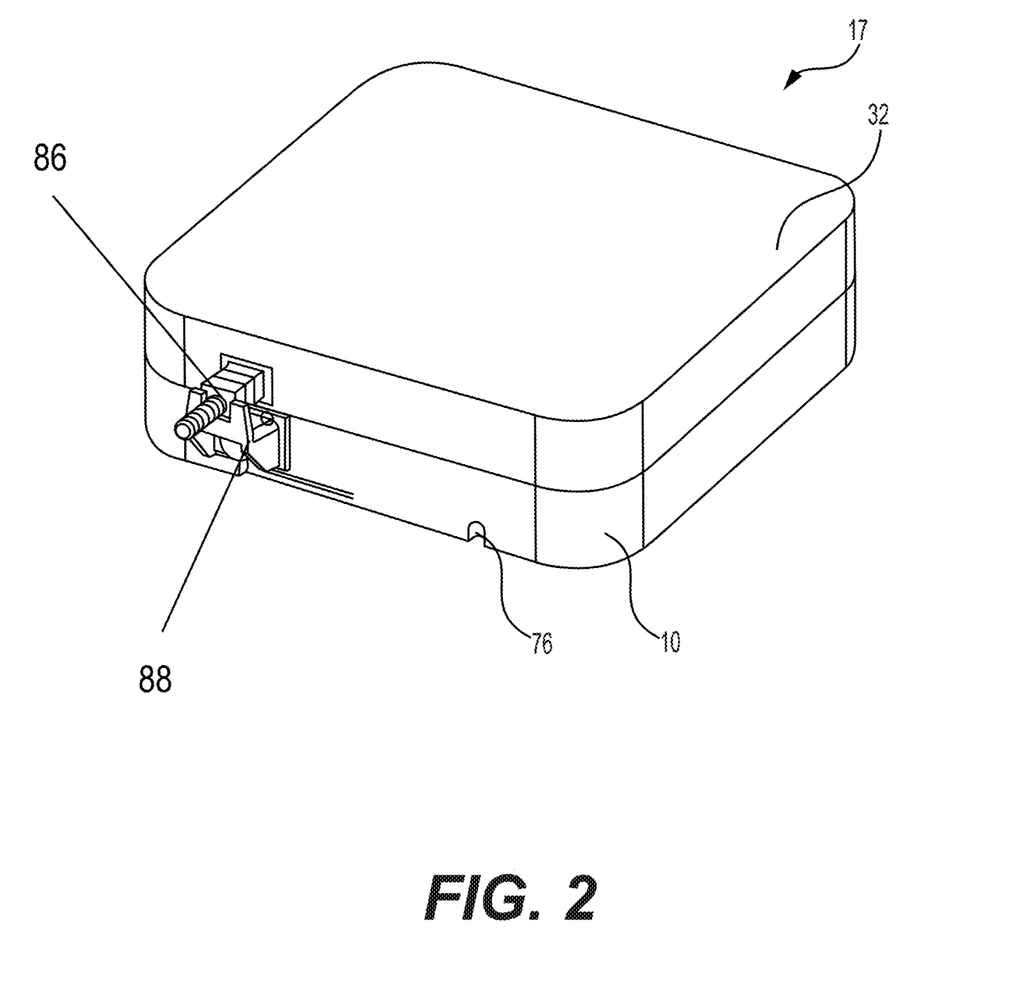
FIG. 2 is an isometric view of an example cable spool module and terminal module according to various embodiments of the present disclosure.
Figure 3:
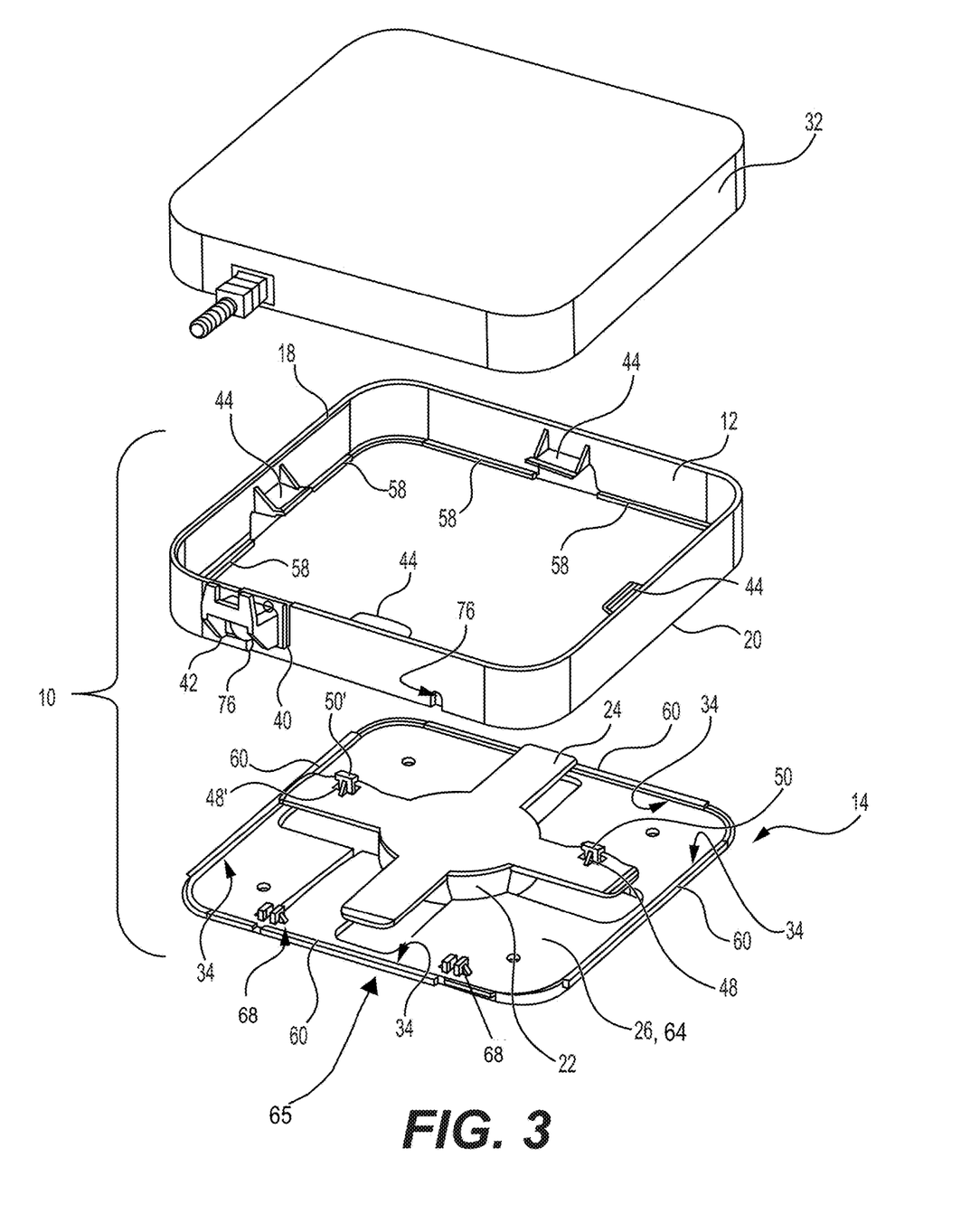
FIG. 3 is an expanded view of an example skirt, cable spool, and the terminal module according to one embodiment of the present disclosure.
Figure 8:
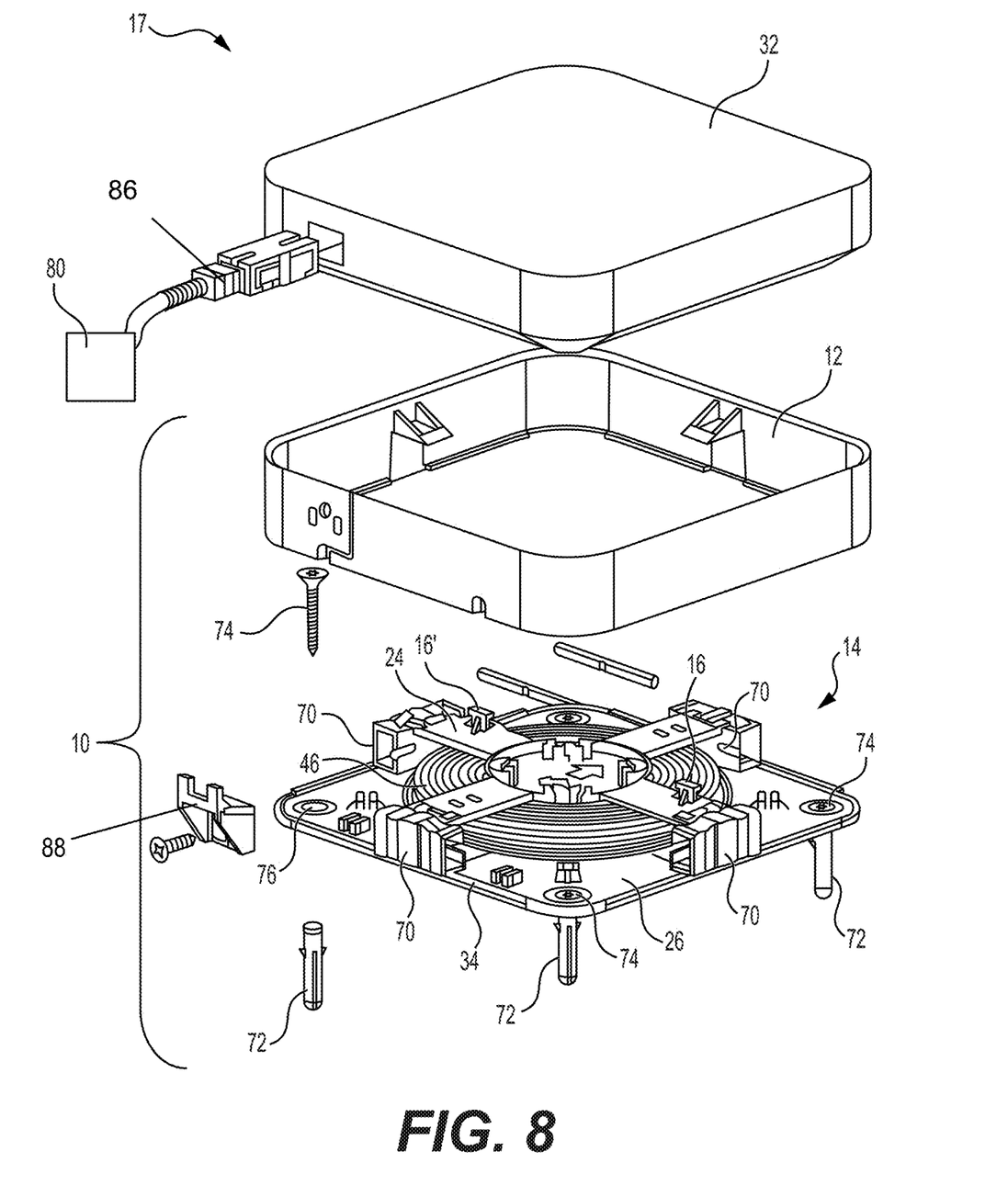
FIG. 8 is an expanded view of an example skirt, cable spool, and the terminal module wherein adapter holders are mounted onto the cable spool.

With reference to FIGS. 2-3 and FIG. 8, a network unit 17 is illustrated having a first module 32 that is in electronic communication with a network (schematically shown as element 80 in FIG. 8) and a second module 10 which may be a cable spool module 10. The first module 32 may be affixed to the second module 10 as described herein. The first module 32 may, but not necessarily be an optical network terminal 32 (ONT). The second module 10 may include a cable retaining portion or cable spool 14, a coupling portion or retention member 16, and an access portion or flexible skirt 12. The retention member 16 may be configured to couple the first module 32 to the cable spool 14 as later described herein. The flexible skirt 12 may be removably affixed to an outer (or peripheral) region 34 of a lower retaining portion or lower flange 26 of the cable spool 14. When flexible skirt 12 is removably affixed to an outer (or peripheral) region 34 of the cable spool 14 and when the retention member 16 couples the first module 32 to the cable spool 14, the flexible skirt 12 and the first module 32 are configured to enclose the cable spool 14 between the lower flange 26 of the cable spool 14, the skirt 12 and the first (or terminal) module 32.

As shown, the skirt 12 is configured to be movable between a storage state (or closed state; shown in FIG. 2), where the skirt 12 is removably attached to the lower flange 26 and the optical network terminal 32, and a payout state (or open state; shown in FIG. 5), where the skirt 12 is detached from the lower flange 26 and the optical t network terminal 32. As mentioned above, the optical network terminal 32 is coupled to the skirt 12 via the cable spool 14 (having the retention member(s) 16, 16'). In the storage state shown in FIG. 2, the skirt 12 is configured to block access to the cable spool 14 and slack fiber optic cable 46 wound on a cable receiving portion or barrel 22 of the cable spool 14 when the skirt 12 is coupled with the lower flange. In the payout state shown in FIG. 5, the skirt 12 is removed from the mounting plate and the optical terminal network 32 and the skirt 12 is configured to permit access to the cable spool 14 and the slack fiber optic cable 46 wound on the barrel 22 of the cable spool 14 to allow for payout of the slack fiber optic cable 46.

As shown in FIG. 8, one or more adapter holders 70 may be mounted between an upper retaining portion or upper flange 24 and the lower flange 26 wherein each adapter holder 70 may be disposed proximate to the outer region 34 of the lower flange 26. Wall mounts 72 may be affixed to the lower flange 26 wherein a mechanical fastener 74 may be disposed in aperture 76 of the lower flange such that the wall mount 72 receives the mechanical fastener 74 whereby each mechanical fastener 74 is configured to couple each wall mount 72 to the lower flange 26.

Figure 4A:
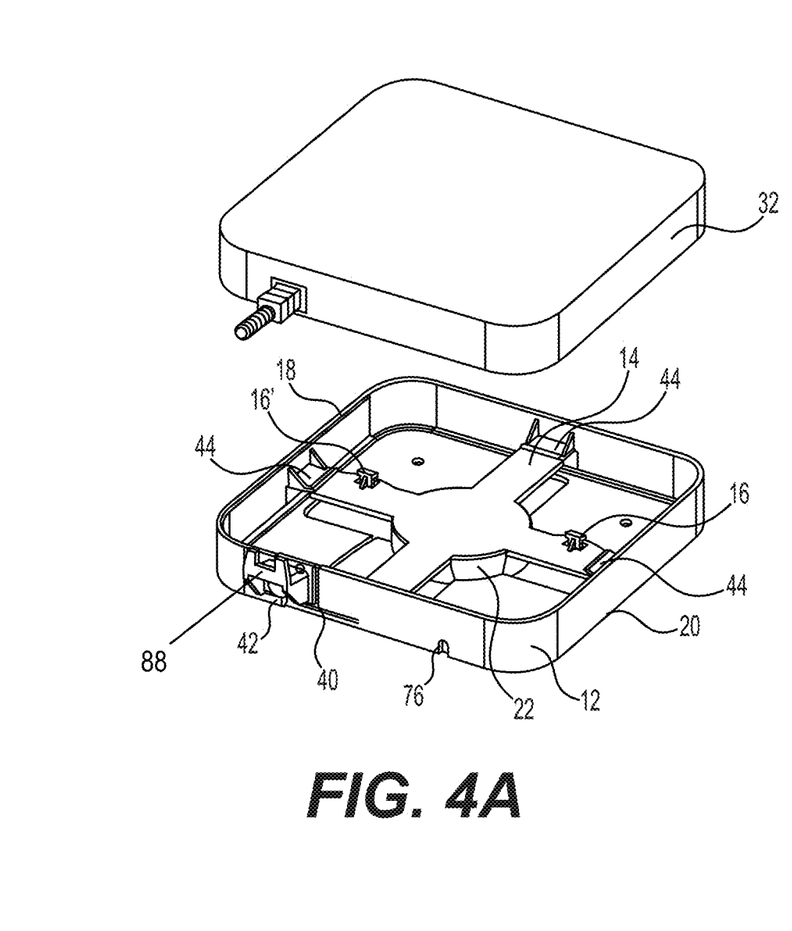
FIG. 4A is an expanded view of the cable spool module and terminal module shown in FIG. 2 where the first end and the second end of the flexible skirt are joined to each other.
Figure 4B:
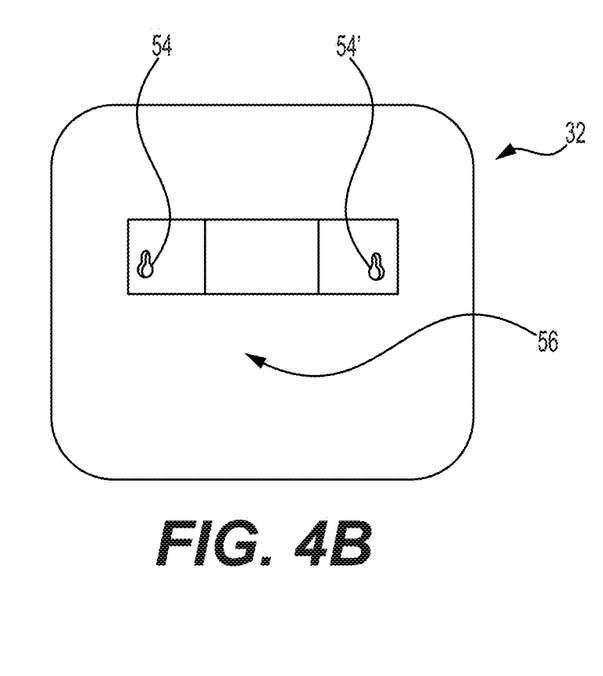
FIG. 4B is a rear view of the terminal module according to the various embodiments of the present disclosure.

With reference to FIG. 4A, the retention member 16 may be affixed to the cable spool 14. The retention member 16 may be configured to engage with an aperture 54 defined on a rear side 56 of the first module as shown in FIG. 4B. It is understood that the distal portion 50 of the retention member 16 may be disposed within the first module's aperture 54 in order to couple the first module to (the cable spool 14 of) the second module. As shown in FIG. 4A, a secondary retention member 16 may also be provided that is also affixed to the cable spool 14 and that is also configured to couple the terminal 32 to the cable spool 14 in a similar manner wherein a distal portion 50 of the secondary retention member 16 is disposed within the secondary terminal aperture 54 defined on the rear side 56 of the first module. (See FIG. 4B).

Figure 5:
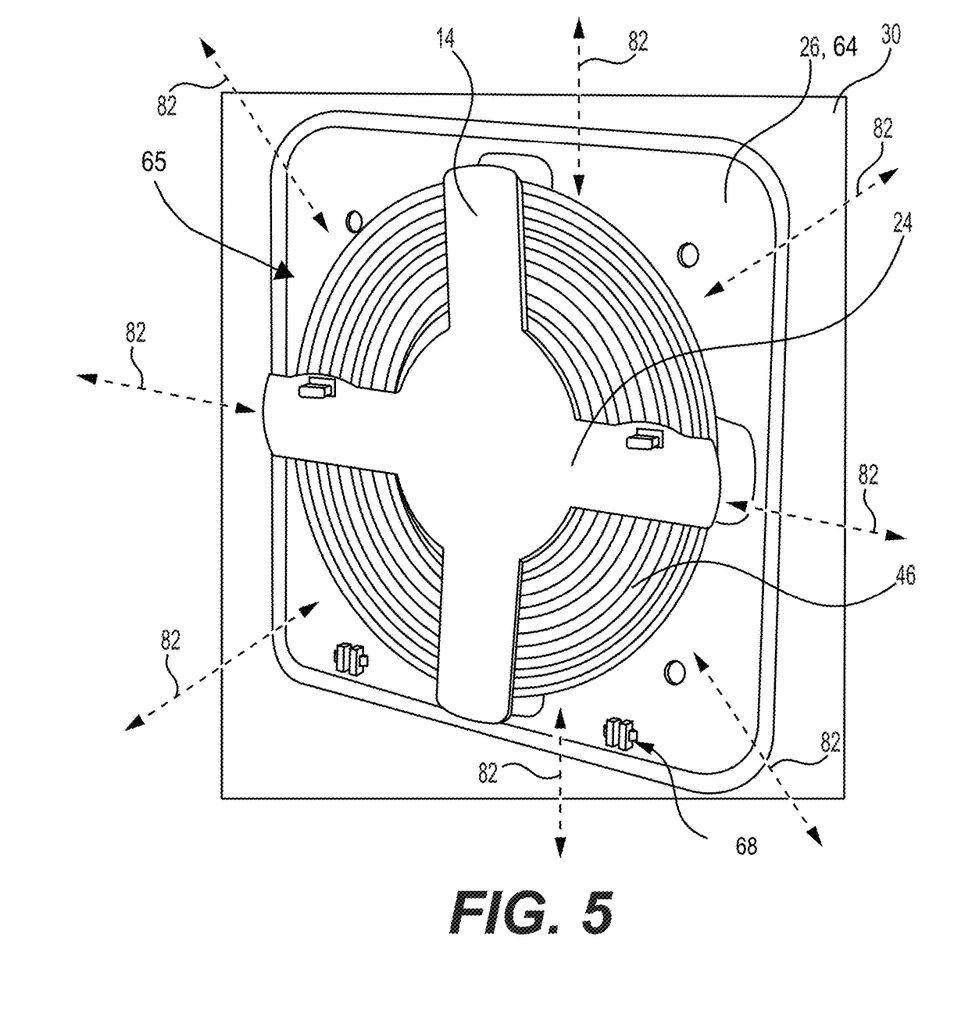
FIG. 5 is a perspective view of a cable spool mounted to a wall wherein a user/technician may wind the excess cable about the barrel of the cable spool.

As shown in FIG. 5, the flexible skirt 12 of the network unit 17 is a flexible, elongated member 15 having a first lateral side 18 and a second lateral side 20 wherein the second lateral side 20 is configured to engage with at least a portion of an outer (or peripheral) region 34 of the cable spool 14. Furthermore, the flexible skirt 12 is an elongated member 15 having a first end 40 and a second end 42 (both shown in FIG. 5) wherein the second end 42 is configured to be joined to the first end 40 when the flexible skirt 12 is mounted to the outer (or peripheral) region 34 of the cable spool 14 (see FIG. 4A).

Figure 6:
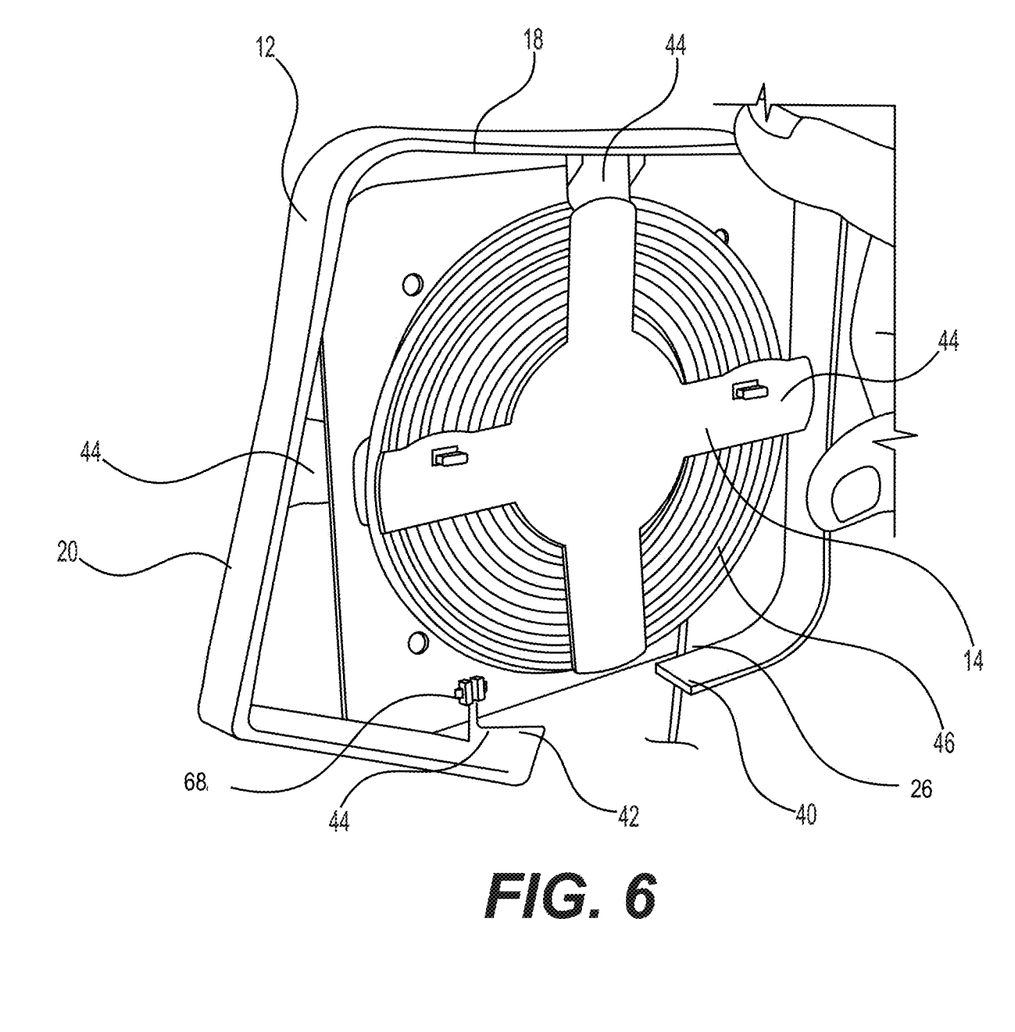
FIG. 6 is a perspective view of the cable spool having the excess cable stored around the barrel of the cable spool wherein the flexible skirt is being attached to the lower flange of the cable spool.

In yet another embodiment of the present disclosure, a cable spool module 10" (FIG. 4A and FIG. 6) for a terminal 32 may be provided wherein the cable spool 14 module 10 includes a flexible skirt 12, a cable spool 14, and a retention member 16. As shown in FIGS. 4A and 6, the flexible skirt 12 includes a first lateral side 18, a second lateral side 20, a first end 40 and a second end 42. As shown in FIGS. 3 and 5, the cable spool 14 including a lower flange 26, an upper flange 24 and a barrel 22 disposed between the lower and upper flanges 24, 26. As shown, the upper flange is integral to a distal end 36 of the barrel 22 and wherein a proximate end 38 of the barrel 22 is integral to the lower flange 26.

As shown in FIG. 5, the lower flange 26 may be mounted to a surface such as a wall. The retention members 16, 16' shown in FIGS. 3 and 5 are configured to couple a terminal module 32 to the cable spool 14.

With reference to FIG. 6, the second lateral side 20 of the flexible skirt 12 is configured to be removably affixed to at least a portion of an outer (or peripheral) region 34 of the lower flange 26. Furthermore, as shown in FIG. 6, the flexible skirt 12 is an elongated member 15 having a first end 40 and a second end 42. Once the excess cable 46 has been properly wound about the barrel 22 (as shown in FIG. 5), then the flexible skirt 12 may, but not necessarily, be mounted to the lower flange 26 by attaching the second lateral side 20 of the flexible skirt 12 to the lower flange 26 in a counter-clockwise manner as shown in FIG. 6. Once the flexible skirt 12 has been affixed to the outer (or peripheral) region 34 of the lower flange 26, the first end 40 and the second end 42 of the skirt 12 may be together via a mechanical fastener or the like as shown in FIG. 4. As shown in FIG. 4A, the flexible skirt 12 further includes an abutment portion or a plurality of interior tabs 44 which are configured to abut an upper surface 62 of the upper flange 24 when the flexible skirt 12 is mounted to the lower flange 26. The interior tabs 44 are configured to prevent the upper flange 24 from being bent or distorted due to the excess cable 46 which has been would about the barrel 22 (see FIG. 5). Once the skirt 12 is installed onto the lower flange 26 of the cable spool 14, the interior tabs 44 also prevent any excess cable portions 46 from inadvertently moving out from under the upper flange 24.

Lastly, as shown in FIGS. 2 and 4A, when a terminal module 32 is attached to the cable spool module 10, the first lateral side 18 of the flexible skirt 12 is configured to abut the terminal module 32 such that the flexible skirt 12 and terminal module 32 encloses the barrel 22 (with excess cable 46) and the upper flange 24 between the terminal module 32 and the lower flange 26. In this embodiment, the retention member 16s (first and second retention member 16s in FIGS. 3 and 5) are configured to couple the terminal module 32 to the cable spool 14. Each retention member 16 is configured to couple the terminal module 32 to the cable spool 14 when a distal portion 50 of each retention member 16 (FIG. 4A) is disposed within a corresponding terminal aperture 54 (FIG. 4B). As shown in FIG. 4B, each terminal aperture 54 may be defined on a rear side 56 of the terminal 32. In the example provided in FIG. 4A, each retention member 16 is configured to couple the terminal module 32 to the upper flange 24 of the cable spool 14. However, it is understood that each retention member 16 may alternatively be mounted to the lower flange 26 of the cable spool 14 wherein the distal portion 50 of each retention member 16 (mounted to the lower flange 26) is configured to be received by a corresponding terminal module 32 in order to couple the terminal module 32 to the cable spool 14.

With respect to various embodiments of the present disclosure where the skirt 12 is configured to be removably affixed to the lower flange 26 of the cable spool 14, it is understood that at least a portion of the outer (or peripheral) region 34 of the lower flange 26 may define an overhang/extension/protuberance 60 that is configured to be interlocked with a corresponding overhang/extension/protuberance 58 defined by the flexible skirt 12. (see FIG. 3). However, it is also understood that at least a portion of the outer (or peripheral) region 34 of the lower flange 26 may define an overhang extension/protuberance 60 that is configured to be interlocked with a corresponding opening or recess defined by the flexible skirt 12. In yet another alternative arrangement, at least a portion of the outer (or peripheral) region 34 of the lower flange 26 may define an opening or recess that is configured to be interlocked with a corresponding overhang 58 or extension 58 or protuberance 58 defined by the flexible skirt 12. As shown in FIG. 3, the skirt 12 may have corresponding cut-outs (or recesses) 76 which also accommodate each portion of the cable 46 that is entering and/or exiting the cable spool module 10.

Moreover, with respect to the various embodiments of the present disclosure where the skirt 12 is configured to be removably affixed to the lower flange 26 of the cable spool 14, the lower flange 26 of the cable spool 14 may further include cable prongs 68 (see FIG. 3) which are disposed proximate to the outer (or peripheral) region 34 of the lower flange 26 to maintain the position of the portions of the cable 46 which enters/exits the cable spool module 10. It is also understood that the lower flange 26 of the cable spool 14 may further define fastener apertures which are configured to receive mechanical fasteners such as screws or nails to secure the lower flange 26 of the cable spool 14 to a surface 30 such as a wall 30 (see FIG. 5).

With respect to the various embodiments of the present disclosure (FIGS. 3, 6, 8), it is understood that the cable spool 14 is configured to distribute a 46 cable to/from a lateral direction 82 as shown in FIG. 5 (when the skirt 12 is not mounted onto one of the lower flange 26 or the plate 64 (shown in FIGS. 4A and 6) thereby allowing a user to have easier access to the cable 46 wound about the barrel 22, 22' of the cable spool 14 and/or allowing a user to wind cable 46 about the barrel 22, 22' in a faster and easier manner. As shown in the example FIG. 2, the skirt 12 and the terminal 32 in the various embodiments of the present disclosure are configured to enclose, protect and store the barrel 22, 22', the cable spool 14 and cable 46 that is wound about the barrel 22, 22' when the skirt 12 is mounted to an outer region of one of the lower flange 26 or the plate and when the retention member 16, 16' couples the terminal 32 to the cable spool 14. Moreover, connector retention bracket 88 (see FIGS. 2, 4A and 8) may be affixed to the skirt 12 using a mechanical fastener as shown. The connector retention bracket 88 prevents the connector 86 (FIGS. 2 and 8) from being unmated from optical network unit 17.

As shown in FIGS. 3 and 5, the lower flange 26 of the cable spool 14 may also constitute the mounting plate 64 of the slack storage assembly 17 such that the cable spool 14 and the mounting plate 64 may be configured to form a monolithic structure 65.

Figure 7:
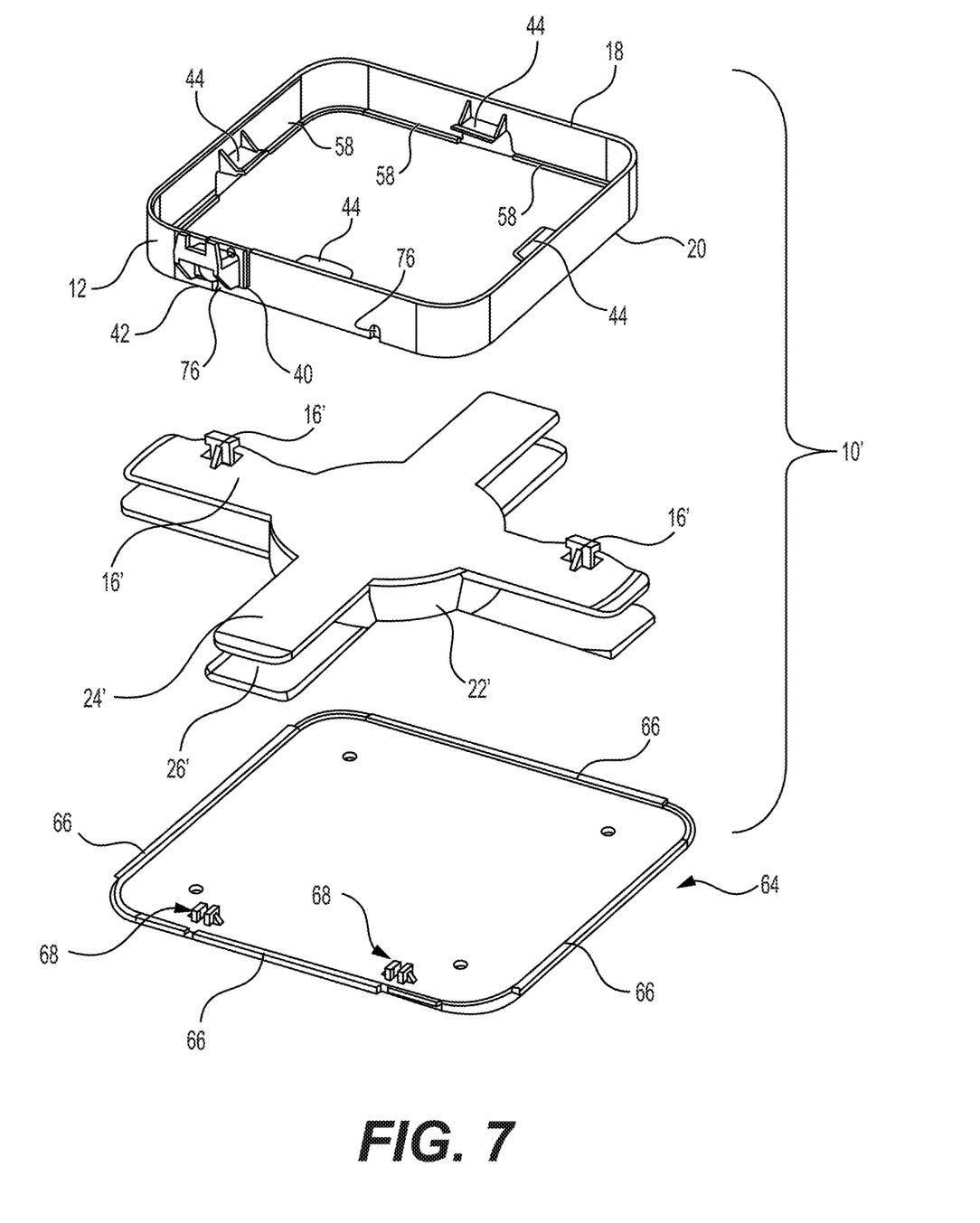
FIG. 7 is an expanded view of the embodiment of the cable spool module which implements a skirt that is configured to attach to a mounting plate.

In yet another embodiment of the present disclosure shown in FIG. 7, a cable spool module 10' for a terminal 32 may include a flexible skirt 12, a mounting plate 64 configured to be mounted to a surface 30, and a cable spool 14'. The skirt 12 may be a flexible, elongated member 15 having a first lateral side 18, a second lateral side 20, a first end 40 and a second end 42. The second lateral side 20 may be configured to engage with at least a portion of an outer (or peripheral) region 34 of the plate 64 or the lower flange 26' of the cable spool 14'. The first end 40 and the second end 42 of the flexible skirt 12 are configured to be joined together with a mechanical fastener when the flexible skirt 12 is mounted to the outer (or peripheral) region 34 of the plate 64 as previously described. (See FIG. 4). The cable spool 14' may be mounted or removably coupled on the plate 64.

Similar to the first embodiment, skirt 12 is configured to be movable between a storage state (see FIG. 2), where the skirt 12 is removably attached to an outer region of the mounting plate 64, and a payout state where the skirt 12 is detached from the mounting plate 64. In the storage state shown in FIG. 2, the skirt 12 is configured to block access to the cable spool 14 and slack fiber optic cable 46 wound on the barrel 22 of the cable spool 14 when the skirt 12 is coupled with the mounting plate 64. In the payout state, the skirt 12 is removed from the mounting plate and the optical network terminal 32 and the skirt 12 is configured to permit access to the cable spool 14 and the slack fiber optic cable 46 wound on the barrel 22 cable spool 14 to allow for payout of the slack fiber optic cable 46.

A retention member 16 may be affixed to the cable spool 14 or the plate 64 wherein the retention member 16 extends away from the cable spool 14 and the plate 64. Each retention member 16, 16' is configured to couple the terminal 32 to at least one of the plate 64 or the cable spool 14' (depending on where the retention member 16 is mounted), The flexible skirt 12 and the terminal 32, are configured to enclose the cable spool 14' when the distal portion of the retention members 16, 16' is disposed within the corresponding terminal apertures 54, 54' (FIG. 4B) and when the flexible skirt 12 is affixed to the outer (or peripheral) region 34 of the plate 64. The optical network terminal 32 may be coupled to the skirt 12 the retention member(s) 16, 16'.

With respect to the present embodiment which implements a mounting plate 64, it is understood that at least a portion of the outer (or peripheral) region 34 of the mounting plate 64 may define an overhang/extension/protuberance 66 that is configured to be interlocked with a corresponding overhang 58 or extension 58 or protuberance 58 defined by the skirt 12. (See FIG. 7). However, it is also understood that at least a portion of the outer (or peripheral) region 34 of the mounting plate 64 may alternatively define an overhang extension/protuberance 66 that is configured to be interlocked with a corresponding opening or recess (not shown) defined by the skirt 12. In yet another alternative arrangement, at least a portion of the outer (or peripheral) region 34 of the mounting plate 64 may define an opening or recess (not shown) that is configured to be interlocked with a corresponding overhang/extension/protuberance 58 defined by the skirt 12.

Moreover, with respect to the various embodiments of the present disclosure which implements a mounting plate 64 for receiving a lower flange 26 of a cable spool 14, the mounting plate 64 may further include cable prongs 68 (see FIG. 7) which are disposed proximate to the outer (or peripheral) region 34 of the mounting plate 64 to maintain the position of the portions of the cable 46 which enters/exits the cable spool 14 module 10. As shown in FIG. 7, the skirt 12 may have corresponding cut-outs (or recesses) 76 which also accommodate each portion of the cable 46 that is entering and/or exiting the cable spool module 10.

With respect to various example embodiments of the present disclosure, each retention member 16, 16' may include a base portion 48, 48' (see for example in FIG. 3) and a distal portion 50, 50'. (see for example in FIG. 3). As shown in FIG. 3, each base portion 48 may extend substantially perpendicularly away from the cable spool 14 and each distal portion 50 may be substantially perpendicular to the secondary base member. It is understood that each distal portion 50, 50' may be disposed within its corresponding terminal aperture 54 defined on a rear side 56 of the terminal module 32 when the retention member(s) 16, 16' couple the terminal module 32 to the cable spool 14. It is further understood that the terminal 32 or terminal module 32 identified in the various example embodiments of the present disclosure is configured to be in electronic communication with a network.

Also, with respect to the various embodiments of the present disclosure, the flexible skirt 12 may further include a plurality of interior tabs 44 (see for example in in FIG. 4) which are configured to abut an upper surface 62 of the upper flange 24 when the flexible skirt 12 is mounted to the lower flange 26 or mounting plate 64. The interior tabs 44 are configured to prevent the upper flange 24 of the cable spool 14 from being bent or distorted due to the excess cable 46 which has been wound about the barrel 22 (see FIG. 5). Once the skirt 12 is installed onto the lower flange 26 of the cable spool 14 (or onto the mounting plate 64), the interior tabs 44 also prevent any excess cable portions 46 from inadvertently moving out from under the upper flange 24.

Figure 9:
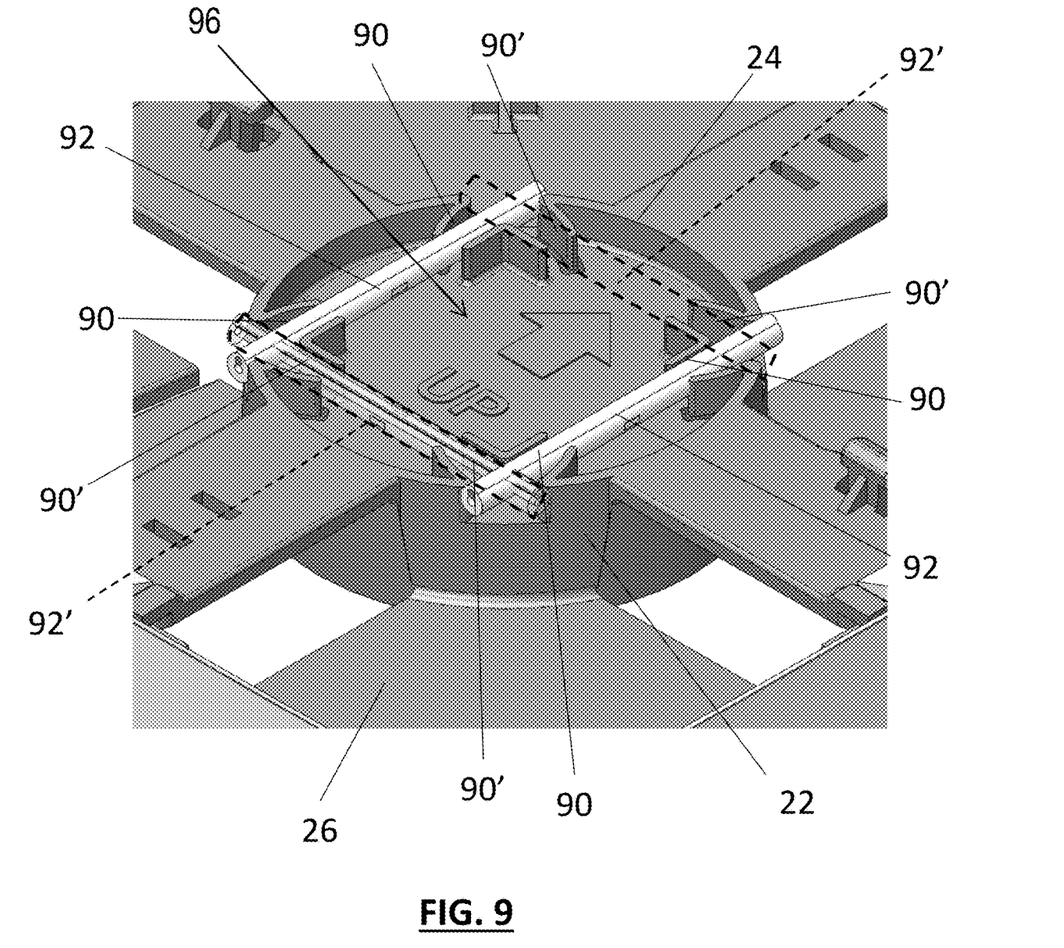
FIG. 9 is an enlarged view of the center region of the upper flange at the top of the hub wherein channels for splice protectors may be defined in order to hold splice protectors.

Referring to FIG. 9, it is understood that all embodiments of the present disclosure may include channels 90, 90' defined in the upper flange 24. As shown in FIG. 9, an enlarged view of the center region 96 of the upper flange 24 at the top of the hub 22 wherein channels 90, 90' for splice protectors 92, 92' may be defined in order to hold splice protectors 92, 92'. The splice protectors 92, 92' are configured to hold and protect spliced fibers (not shown). In the non-limiting example of FIG. 9, two splice protectors or splice sleeves 92 are disposed in parallel channels 90 defined in the center region 96 of upper flange 24. Alternatively, two splice protectors or splice sleeves 92' (shown in phantom) may be disposed in parallel channels 90' defined in the center region 96 of upper flange 24. As shown, channels 90 are perpendicular to channels 90'.

While non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A cable spool module for a terminal module comprising:
   an access portion;
   a cable retaining portion including a lower retaining portion, an upper retaining portion, and a cable receiving portion disposed between the lower and upper retaining portion, wherein the cable receiving portion is configured for slack fiber optic cable to be wound thereon and between the lower and upper retaining portions;
   a coupling portion structurally configured to couple a terminal module to the cable retaining portion;
   wherein the lower retaining portion is structurally configured to be mounted to a surface; and
   wherein, while the terminal module is coupled to the cable retaining portion and the lower retaining portion is mounted to a surface, the access portion is configured to be moved between a storage state, where the access portion is coupled with the lower retaining portion and the terminal module, and a payout state, where the access portion is decoupled from the lower retaining portion and the terminal module.

2. The cable spool module of claim 1, wherein the access portion is configured to block access to the cable retaining portion and the slack fiber optic cable wound on the cable retaining portion when the access portion is coupled to the lower retaining portion and the terminal module.

3. The cable spool module of claim 2, wherein the access portion is configured to be removed from the lower retaining portion and the terminal module to permit access to the cable retaining portion and the slack fiber optic cable wound on the cable retaining portion in the payout state to allow for payout of the slack fiber optic cable.

4. The cable spool module of claim 1, wherein the access portion comprises an elongated portion having a first end portion and a second end portion that is configured to be joined to the first end portion in the storage state and separated from the first end portion in the payout state.

5. The cable spool module of claim 1, wherein the access portion includes an abutment portion that is configured to abut an upper surface of the upper retaining portion when the access portion is coupled to the lower retaining portion so as to prevent the slack fiber optic cable from unwinding from the cable receiving portion when the access portion is attached to the lower retaining portion.

6. The cable spool module of claim 1, wherein the coupling portion is configured to couple the terminal module to the cable retaining portion when a portion of the coupling portion is disposed within an opening portion defined by the terminal module.

7. The cable spool module of claim 1, wherein the coupling portion is integrally formed with the upper retaining portion.

8. The cable spool module of claim 1, further comprising a secondary retention member that is configured to be affixed to the cable retaining portion and is configured to couple the terminal module to the cable retaining portion.

9. The cable spool module of claim 8, wherein the coupling portion includes a base portion and a distal portion;

wherein the base portion is configured to extend substantially perpendicularly away from the cable retaining portion;

wherein the distal portion is substantially perpendicular to the base portion;

wherein the secondary retention member includes a secondary base portion and a secondary distal portion; and wherein the secondary base portion is configured to extend substantially perpendicularly away from the cable retaining portion and the secondary distal portion is substantially perpendicular to the secondary base portion.

10. A cable spool module for a terminal module comprising:

an access portion;

a cable retaining portion including a lower retaining portion, an upper retaining portion, and a cable receiving portion disposed between the lower and upper retaining portion, wherein the cable receiving portion is configured for cable to be wound thereon and between the lower and upper retaining portions;

a coupling portion structurally configured to couple a terminal module to the cable retaining portion;

wherein the access portion is configured to be affixed to at least a portion of an outer region of the lower retaining portion;

wherein the access portion is configured to be moved between a storage state, where the access portion is attached to the lower retaining portion and the terminal module, and a payout state, where the access portion is detached from the lower retaining portion and the terminal module;

wherein the access portion is configured to block access to the cable retaining portion and slack fiber optic cable wound on the cable retaining portion when the access portion is coupled with the lower retaining portion;

wherein the access portion is configured to be removed from the outer region to permit access to the cable retaining portion and the slack fiber optic cable wound on the cable retaining portion in the payout state to allow for payout of the slack fiber optic cable; and wherein the access portion is configured to be moved between the storage state and the payout state while the lower retaining portion is mounted to a mounting surface and the upper retaining portion is coupled to the terminal module.

11. The cable spool module of claim 10, wherein the access portion comprises an elongated portion having a first end portion and a second end portion that is configured to be joined to the first end portion in the storage state and separated from the first end portion in the payout state.

12. The cable spool module of claim 11, wherein the access portion includes an abutment portion that is configured to abut an upper surface of the upper retaining portion when the access portion is mounted to the lower retaining portion so as to prevent the slack fiber optic cable from unwinding from the cable receiving portion when the access portion is coupled with the lower retaining portion.

13. The cable spool module of claim 10, wherein the coupling portion is configured to couple the terminal module to the cable retaining portion when a portion of the coupling portion is disposed within an opening portion defined by the terminal module.

14. The cable spool module of claim 10, further comprising a secondary retention member that is configured to be affixed to the cable retaining portion and is configured to couple the terminal module to the cable retaining portion.

15. The cable spool module of claim 14, wherein the coupling portion includes a base portion and a distal portion;

wherein the base portion is directly affixed to the cable retaining portion so as to extend substantially perpendicularly away from the cable retaining portion;

wherein the distal portion is substantially perpendicular to the base portion;

wherein the secondary retention member includes a secondary base portion and a secondary distal portion; and wherein the secondary base portion is configured to extend substantially perpendicularly away from the cable retaining portion and the secondary distal portion is substantially perpendicular to the secondary base portion.

16. The cable spool module of claim 10, wherein the access portion is configured to permit access to the cable retaining portion and the slack fiber optic cable wound on the cable receiving portion in the payout state to allow for payout of the slack fiber optic cable in a lateral direction relative to the cable retaining portion when the lower retaining portion is mounted to a surface.

17. A cable spool module for a terminal module comprising:

a skirt;

a cable spool including a lower flange, an upper flange and a barrel disposed between the lower and upper flanges, wherein the barrel is configured for cable to be wound thereon and between the lower and upper flanges, wherein the lower flange is structurally configured to be mounted to a surface;

a retention member structurally configured to couple a terminal module to the upper flange;

wherein the skirt is structurally configured to be selectively affixed to and removed from at least a portion of an outer region of the lower flange while the terminal module is coupled to the upper flange and the lower flange is mounted to the surface;

wherein the skirt is structurally configured to be movable between a storage state, where the skirt is attached to the lower flange and the terminal module, and a payout state, where the skirt is detached from the lower flange and the terminal module;

wherein the skirt is structurally configured to block access to the cable spool and slack fiber optic cable wound on the cable spool when the skirt is coupled with the lower flange; and wherein the skirt is structurally configured to be removed from the outer region to permit access to the cable spool and the slack fiber optic cable wound on the cable spool in the payout state to allow for payout of the slack fiber optic cable.

18. The cable spool module of claim 17, wherein the skirt comprises an elongated member having a first end and a second end that is configured to be joined to the first end in the storage state and detached from the first end in the payout state.

19. The cable spool module of claim 18, wherein the skirt includes an interior tab that is configured to abut an upper surface of the upper flange when the skirt is mounted to the lower flange so as to prevent the slack fiber optic cable from unwinding from the cable spool when the skirt is coupled with the lower flange.

20. The cable spool module of claim 19, wherein the retention member extends directly from the upper flange and is configured to couple the terminal module to the cable spool when a portion of the retention member is disposed within an aperture defined by the terminal module.

21. The cable spool module of claim 17, further comprising a secondary retention member that is configured to be affixed to the cable spool and is configured to couple to the terminal module to the cable spool.

22. The cable spool module of claim 21, wherein the retention member includes a base portion and a distal portion;
   wherein the base portion is directly affixed to the cable spool so as to extend substantially perpendicularly away from the cable spool;
   wherein the distal portion is substantially perpendicular to the base portion;
   wherein the secondary retention member includes a secondary base portion and a secondary distal portion; and
   wherein the secondary base portion is configured to extend substantially perpendicularly away from the cable spool and the secondary distal portion is substantially perpendicular to the secondary base portion.

23. The cable spool module of claim 21, wherein the skirt is configured to permit access to the cable spool and the slack fiber optic cable wound on the cable spool in the payout state to allow for payout of the slack fiber optic cable in a lateral direction relative to the barrel when the lower flange is mounted to a surface.

24. A cable spool module for a terminal comprising:
   a skirt having a first lateral side and a second lateral side;
   a cable spool having a barrel, an upper flange, and a lower flange that is configured to be mounted to a surface;
   a retention member configured to couple a terminal to the upper flange of the cable spool;
   wherein the second lateral side of the skirt is configured to be selectively affixed to and removed from at least a portion of an outer region of the lower flange;
   wherein the barrel and the upper flange are configured to be disposed between the lower flange and the terminal;
   wherein, while the lower flange is mounted to the surface and the terminal is coupled to the upper flange, the skirt is structurally configured to be moved between a storage state, where the skirt is attached to the lower flange and the terminal, and a payout state, where the skirt is detached from the lower flange and the terminal;
   wherein the skirt is structurally configured to block access to the cable spool and slack fiber optic cable wound on the cable spool in the storage state; and
   wherein the skirt is structurally configured to permit access to the cable spool and the slack fiber optic cable wound on the cable spool in the payout state to allow for payout of the slack fiber optic cable in a lateral direction relative to the barrel when the lower flange is mounted to the surface.

25. The cable spool module of claim 24 wherein the upper flange is integral with a distal end of the barrel and wherein a proximate end of the barrel is integral with the lower flange.

26. The cable spool module of claim 25, wherein the skirt comprises an elongated member having a first end and a second end configured to be joined to the first end in the storage state and detached from the first end in the payout state.

27. The cable spool module of claim 24, wherein the skirt includes an interior tab that is configured to abut an upper surface of the upper flange when the skirt is mounted to the lower flange.

28. The cable spool module of claim 27, wherein the retention member is configured to directly extend from the upper surface of the upper flange to couple the terminal to the cable spool when a distal portion of the retention member is disposed within a terminal aperture.

29. The cable spool module of claim 28, wherein the terminal aperture is defined on a rear side of the terminal.

30. The cable spool module of claim 24, wherein the retention member includes a base portion and a distal portion;
   wherein the base portion is directly affixed to an upper surface of the upper flange so as to extend substantially perpendicularly away from the cable spool; and
   wherein the distal portion is substantially perpendicular to the base portion.

31. The cable spool module of claim 30, further comprising a secondary retention member that is affixed to the cable spool and configured to couple the terminal to the cable spool;
   wherein the secondary retention member includes a secondary base portion and a secondary distal portion; and
   wherein the secondary base portion is configured to extend substantially perpendicularly away from the cable spool, and wherein the secondary distal portion is substantially perpendicular to the secondary base portion.

32. The cable spool module of claim 24, wherein a portion of the second lateral side of the skirt defines a skirt overhang and a portion of the lower flange defines a flange overhang extending outward from at least a portion of a perimeter of the lower flange, wherein the skirt overhang is configured to be interlocked with the flange overhang.

33. A slack storage assembly configured to selectively provide access to slack fiber optic cable of an optical network terminal stored within a periphery of the optical network terminal, comprising:
   a mounting plate structurally configured to be mounted to a surface;
   an optical network terminal structurally configured to be coupled with the mounting plate;
   a skirt structurally configured to be selectively coupled with and decoupled from the mounting plate and the optical network terminal while the optical network terminal is coupled with the mounting plate;
   wherein the mounting plate includes a cable spool structurally configured to receive slack fiber optic cable that is configured to be coupled with the optical network terminal;
   wherein the cable spool includes a barrel and a flange configured to extend radially outward from the barrel;
   wherein the cable spool includes a retention member configured to extend from the cable spool and to couple the optical network terminal to the cable spool;
   wherein the skirt includes a first end, a second end, and a plurality of walls between the first end and the second end;
   wherein the first end and the second end are structurally configured to be coupled together such that the walls are configured to form a perimeter that attaches to a perimeter of the mounting plate and a perimeter of the optical network terminal;
   wherein the cable spool is configured to store the slack fiber optic cable within the periphery of the optical network terminal;
   wherein the skirt is structurally configured to be moved between a storage state, where the skirt is attached to the mounting plate and the optical network terminal, and a payout state, where the skirt is detached from the mounting plate and the optical network terminal;

wherein the skirt is configured to extend from the mounting plate to the optical network terminal in the storage state when coupled with the mounting plate and the optical network terminal such that the skirt is configured to block access to the cable spool and the slack fiber optic cable wound on the cable spool when the skirt is coupled with the mounting plate and the optical network terminal;

wherein the skirt is structurally configured to permit access to the cable spool and the slack fiber optic cable wound on the cable spool in the payout state to allow for payout of the slack fiber optic cable; and wherein the skirt includes a tab configured to extend toward an interior of the skirt and to abut the flange so as to prevent the slack fiber optic cable from unwinding from the cable spool when the skirt is coupled with the mounting plate.

34. The slack storage assembly of claim 33, wherein the cable spool and the mounting plate are configured to form a monolithic structure.

35. The slack storage assembly of claim 33, wherein the cable spool is configured to be coupled with the mounting plate.

36. The slack storage assembly of claim 33, wherein the mounting plate defines an overhang extending outward from at least a portion of the perimeter of the mounting plate, wherein the overhang is configured to be received within one of a recess or an opening defined by the skirt.

37. The slack storage assembly of claim 33, wherein at least a portion of a lateral side of the skirt defines an overhang that is configured to be received within one of a recess or opening defined in an outer region of the mounting plate.

38. The slack storage assembly of claim 33, wherein the retention member includes a base portion that extends substantially perpendicularly away from the cable spool and a distal portion that is integral with the base portion and is substantially perpendicular to the base portion.

39. The slack storage assembly of claim 33, wherein the retention member is configured to directly extend from the flange.

* * * * *